US012332492B2

(12) United States Patent
Abernathy et al.

(10) Patent No.: US 12,332,492 B2
(45) Date of Patent: Jun. 17, 2025

(54) JETTING OPTIMIZED OUTDOOR AND INDOOR MULTI-FUNCTION DROP CABLE

(71) Applicant: CORNING RESEARCH & DEVELOPMENT CORPORATION, Corning, NY (US)

(72) Inventors: George Cornelius Abernathy, Hildebran, NC (US); Corey Scott Keisler, Conover, NC (US); Jason Clay Lail, Wilmington, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 0 days.

(21) Appl. No.: 18/370,588

(22) Filed: Sep. 20, 2023

(65) Prior Publication Data
US 2024/0012218 A1  Jan. 11, 2024

Related U.S. Application Data

(60) Division of application No. 17/516,848, filed on Nov. 2, 2021, now Pat. No. 11,789,228, which is a
(Continued)

(51) Int. Cl.
*G02B 6/44* (2006.01)
(52) U.S. Cl.
CPC ......... *G02B 6/4477* (2013.01); *G02B 6/4431* (2023.05); *G02B 6/4432* (2013.01); *G02B 6/4433* (2013.01)
(58) Field of Classification Search
CPC ... G02B 6/4431; G02B 6/4432; G02B 6/4433
See application file for complete search history.

(56) References Cited

U.S. PATENT DOCUMENTS 6,101,305 A    8/2000  Wagman et al.
6,232,377 B1 * 5/2001  Hayashi .................. C08L 23/08
                                                524/436
(Continued)

FOREIGN PATENT DOCUMENTS

EP           296836 B1 * 10/1994  ............. G02B 6/443
EP           3179286 A1    6/2017
WO     WO-0184206 A2 * 11/2001  ........... G02B 6/4433

OTHER PUBLICATIONS

European Patent Application No. 20802916.5, Extended European Search Report dated May 3, 2023; 8 pages; European Patent Office.
(Continued)

*Primary Examiner* — Charlie Y Peng
(74) *Attorney, Agent, or Firm* — Thomas R. Irwin

(57) ABSTRACT

An optical fiber drop cable including a cable jacket having an outer surface defining the outermost surface of the optical fiber drop cable. The optical fiber drop cable also includes a subunit, a first strength element, and a second strength element. The first strength element, the second strength element, and the subunit are embedded in the cable jacket, and the first strength element, the second strength element, and the subunit are arranged substantially parallel to each other on a first plane. The subunit includes a buffer tube having an inner surface and an outer surface, at least one optical fiber, and a plurality of strengthening yarns. The plurality of strengthening yarns are disposed between the inner surface of the buffer tube and the at least one optical fiber, and the outer surface of the buffer tube is at least partially in contact with the cable jacket.

14 Claims, 4 Drawing Sheets

Related U.S. Application Data continuation of application No. PCT/US2020/031555, filed on May 6, 2020.

(60) Provisional application No. 62/844,372, filed on May 7, 2019.

(56) References Cited

U.S. PATENT DOCUMENTS

| | | | |
|---|---|---|---|
| 6,370,303 B1* | 4/2002 | Fitz | G02B 6/4422 385/113 |
| 7,778,511 B1 | 8/2010 | Bradley et al. | |
| 8,355,613 B2 | 1/2013 | Weimann | |
| 2001/0043781 A1 | 11/2001 | Yokokawa et al. | |
| 2002/0034367 A1 | 3/2002 | Gaillard et al. | |
| 2002/0126970 A1 | 9/2002 | Anderson et al. | |
| 2005/0013573 A1 | 1/2005 | Lochkovic et al. | |
| 2006/0280413 A1 | 12/2006 | Paschal et al. | |
| 2007/0047884 A1 | 3/2007 | Storaasli et al. | |
| 2008/0273845 A1 | 11/2008 | Weimann | |
| 2008/0279514 A1 | 11/2008 | Kundis et al. | |
| 2009/0074367 A1 | 3/2009 | Shinoski et al. | |
| 2011/0268400 A1 | 11/2011 | Lovie et al. | |
| 2013/0094821 A1 | 4/2013 | Logan | |
| 2013/0108226 A1 | 5/2013 | Gimblet et al. | |
| 2014/0029903 A1* | 1/2014 | Blazer | G02B 6/4432 427/163.2 |
| 2015/0110451 A1 | 4/2015 | Blazer et al. | |
| 2015/0268430 A1 | 9/2015 | Bringuier et al. | |
| 2016/0202435 A1 | 7/2016 | Lang et al. | |
| 2016/0216468 A1 | 7/2016 | Gimblet et al. | |
| 2018/0348460 A1 | 12/2018 | Sahoo et al. | |
| 2019/0064469 A1 | 2/2019 | Kumar et al. | |
| 2021/0041655 A1* | 2/2021 | Sahoo | G02B 6/4432 |

OTHER PUBLICATIONS

International Search Report and Written Opinion of the International Searching Authority; PCT/US2020/031555; dated Sep. 16, 2020; 18 pages; US Patent Office.

\* cited by examiner

JETTING OPTIMIZED OUTDOOR AND INDOOR MULTI-FUNCTION DROP CABLE

CROSS-REFERENCED TO RELATED APPLICATIONS

This application is a divisional of U.S. patent application Ser. No. 17/516,848 filed Nov. 2, 2021, which is a continuation of International Application No. PCT/US2020/031555, filed May 6, 2020, and claims the benefit of priority under 35 U.S.C. § 119 of U.S. Provisional Application Ser. No. 62/844,372 filed on May 7, 2019, the content of each of which is relied upon and incorporated herein by reference in their entirety.

BACKGROUND

The disclosure relates generally to optical fiber cables and more particularly to an outdoor and indoor drop cable configured for enhanced jetting performance. Cables, such as power transmission cables, telephone cables, optical fiber cable, etc., are used to transmit electricity and/or data over distance. In order to do so, the cables have to be strung across land and/or buried in the ground between electricity/data sources and delivery points. The last leg of the network is the fiber going directly to a premises. The cables designed to provide this last leg of the network are often referred to as drop cables.

SUMMARY

In one aspect, embodiments of the present disclosure relate to an optical fiber drop cable. The optical fiber drop cable includes a cable jacket having an outer surface defining the outermost surface of the optical fiber drop cable. The optical fiber drop cable also includes at least one subunit, a first strength element disposed on a first side of the at least one subunit, and a second strength element disposed on a second side of the at least one subunit. The first strength element, the second strength element, and the at least one subunit are embedded in the cable jacket, and the first strength element, the second strength element, and the at least one subunit are arranged substantially parallel to each other on a first plane. Each of the at least one subunit includes a buffer tube having an inner surface and an outer surface, at least one optical fiber, and a plurality of strengthening yarns. The plurality of strengthening yarns are disposed between the inner surface of the buffer tube and the at least one optical fiber, and the outer surface of the buffer tube is at least partially in contact with the cable jacket.

In another aspect, embodiments of the present disclosure relate to a method in which an optical fiber drop cable is fed through a duct. The optical fiber drop cable includes a cable jacket in which at least one subunit, a first strength member, and a second strength member are embedded. Each of the at least one subunit includes a flame retardant buffer in contact with the cable jacket. The flame retardant buffer tube defines a central bore including at least one optical fiber and a plurality of strengthening yarns wrapped around the at least one optical fiber. The cable jacket is removed from the optical fiber drop cable to expose the at least one subunit, and the at least one subunit is routed within a premises.

In still another aspect, embodiments of the present disclosure relate to a drop cable. The drop cable includes a polyethylene cable jacket extending along a longitudinal axis of the drop cable and having a first outer surface defining the outermost surface of the drop cable. The polyethylene cable jacket defines a circular cross-sectional surface perpendicular to the longitudinal axis. The drop cable also includes a tight-buffered optical fiber having a second outer surface in contact with the polyethylene cable jacket, a first strength element disposed on a first side of the tight-buffered optical fiber, and a second strength element disposed on a second side of the tight-buffered optical fiber. Further, the drop cable includes a first access feature of a first strip of a first polymer dissimilar to polyethylene. The first access feature is embedded in the polyethylene cable jacket. Further, the drop cable includes a second access feature of a second strip of the first polymer. The second access feature is embedded in the polyethylene cable jacket. A first plane running through the first strength element and the second strength element is transverse to a second plane running through the first access feature and the second access feature.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and operation of the various embodiments. In the drawings.

DETAILED DESCRIPTION

Referring generally to the figures, various embodiments of an optical fiber drop cable configured for indoor and outdoor use and having improved jetting performance are disclosed. The optical fiber drop cable includes a cable jacket having a substantially round cross-section that is made from a low friction polymer material, which facilitates jetting of the cable through a duct (i.e., pushing a cable through a duct using, in part, compressed fluid, such as air). In embodiments, the drop cable is jetted through an outdoor duct to a premises where the cable jacket is stripped, exposing at least one subunit configured for indoor use. For indoor use, embodiments of each subunit of the drop cable have a flame retardant jacket surrounding strengthening yarns, which surround one or more optical fibers. In embodiments, the flame-retardant jacket meets relevant flame retardant standards for indoor use. In other embodiments, the drop cable includes a cable jacket, having the round cross-section and low-friction properties mentioned above, that directly contacts a tight-buffered optical fiber. In embodiments, the tight-buffered optical fiber jacket is composed of a flame-retardant material.

Advantageously, the embodiments of the optical fiber drop cables disclosed herein facilitate installation of a fiber optic network to premises using a single cable that can span the outdoor and indoor branches leading to the premises. These and other aspects and advantages will be discussed in more detail with respect to the exemplary embodiments discussed and depicted herein. These embodiments are presented by way of illustration and not by way of limitation. A person of ordinary skill in the art, upon consideration of the present disclosure, may recognize other embodiments or configurations that fall within the spirit or scope of the present disclosure.

Figure 1:
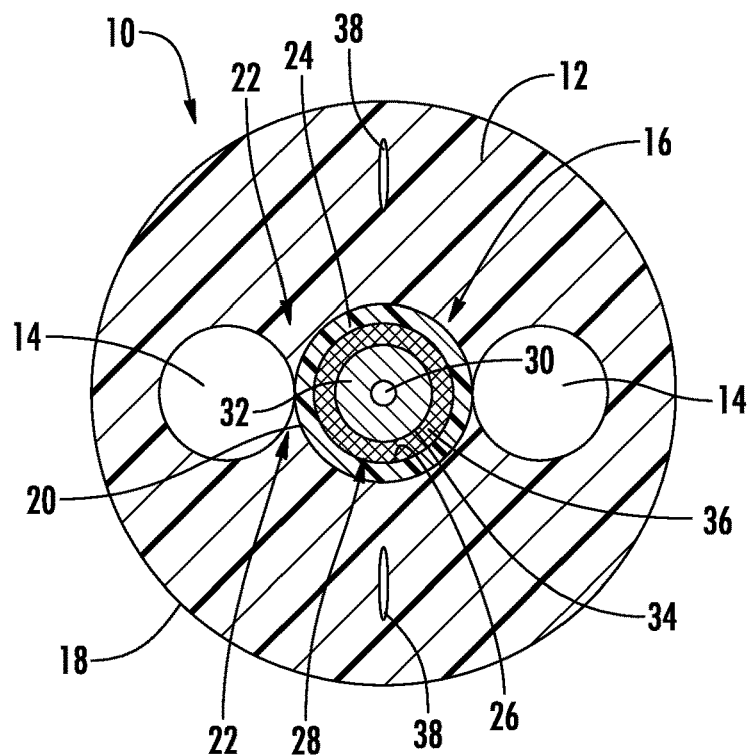
FIG. 1 depicts a longitudinal cross-sectional view of a drop cable for outdoor and indoor use and having a subunit with an optical fiber, according to an exemplary embodiment.

FIG. 1 depicts a longitudinal cross-sectional view of an exemplary embodiment of an optical fiber drop cable 10 ("drop cable" for short) according to the present disclosure. The drop cable 10 includes a cable jacket 12 disposed around two strength elements 14 and a subunit 16. The cable jacket 12 is made of a polymer composition. In embodiments, the polymer composition includes at least one of ethylene-vinyl acetate copolymers, ethylene-acrylate copolymers, polyethylene homopolymers (low, medium, and high density), linear low-density polyethylene, very low-density polyethylene, polypropylene homopolymer, polyolefin elastomer copolymer, polyethylene-polypropylene copolymer, butene- and octane-branched copolymers, or maleic anhydride-grafted versions of the polymers listed above. In another embodiment, exemplary polymers include halogenated thermoplastics (such as polyvinyl chloride); fluoropolymers; polyamide 6, 6/6, 11, or 12 resins; thermoplastic polyurethane; or a crosslinked polyethylene. In particular embodiments, the polymer composition of the cable jacket 12 includes a polyethylene, such as medium density polyethylene or high-density polyethylene, which have relatively low coefficients of friction of about 0.15-0.25. Because the cable is designed for outdoor use, the cable jacket 12 may also contain additives that enhance the ability of the cable jacket 12 to withstand environmental degradation. For example, in embodiments, the cable jacket 12 contains carbon black (e.g., at least 2.35 wt %) to provide UV protection.

Additionally, as can be seen in FIG. 1, the cable jacket 12 has an outer jacket surface 18 that defines a substantially circular cross-section for the drop cable 10. In embodiments, the circular cross-section has a diameter of from 3 mm to 12 mm. In other embodiments, the diameter is from 4 mm to 8 mm, and in still other embodiments, the diameter is from 5 mm to 6 mm. In embodiments, the outer surface 18 defines the outermost surface of the drop cable 10, and thus, the diameter is an outer diameter of the drop cable 10. The low coefficient of friction and circular cross-section facilitate jetting of the drop cable 10 through a duct. During jetting, the drop cable 10 is pushed through a duct while a compressed fluid (e.g., air) is injected into the duct inlet. The high speed of the compressed fluid propels the drop cable 10 through drag forces and pressure drop and by reducing the friction of the drop cable 10 against the duct. Thus, the effects produced by jetting are enhanced by the properties of the drop cable 10 disclosed herein.

In the embodiment of FIG. 1, the two strength elements 14 and the subunit 16 are embedded in the cable jacket 12. The strength elements 14 may be made from any of a variety of suitable materials. In embodiments, the strength elements 14 are made from glass-reinforced-plastic (GRP), metal wire or cable, carbon fiber, and the like. In embodiments, the strength elements 14 have a diameter of from 0.5 mm to 1.5 mm. In embodiments, the strength elements 14 run the length of the drop cable 10 alongside the subunit 16. In certain embodiments, the strength elements 14 contact an outer surface 20 of the subunit 16. In embodiments, interstitial regions 22 are formed between each strength element 14 and the outer surface 20 of the subunit 16. A water-blocking element, such as a yarn impregnated with water-blocking material, may be disposed within one or more of the interstitial regions 22. In other embodiments, the strength elements 14 may be wrapped with a water-blocking tape or yarn.

The subunit 16 includes a buffer tube 24 that defines the outer surface 20 of the subunit 16. In embodiments, the outer surface 20 of the buffer tube is in contact, at least in part, with the cable jacket 12, i.e., there are no layers disposed between the outer surface 20 of the subunit 16 and the cable jacket 12. In embodiments, the cable jacket 12 is in contact with at least 50% of the surface area of the outer surface 20, more particularly with at least 75% of the surface are of the outer surface 20. The buffer tube 24 also has an inner surface 26 that defines a central bore 28. Disposed within the central bore 28 is an optical fiber 30. In the embodiment depicted, the optical fiber 30 is contained within a tight-buffered fiber jacket 32. In embodiments, the fiber jacket 32 defines a diameter, e.g., of 900 µm, and the optical fiber 30 within the fiber jacket 32 may have a diameter, e.g., of 250 µm (defined by the fiber core, cladding, and one or more coating layers (not shown)).

Disposed between an outer surface 34 of the fiber jacket 32 and the inner surface 26 of the buffer tube 24 are a plurality of strengthening yarns 36. In embodiments, the strengthening yarns 36 may be wrapped around the outer surface 34 of the fiber jacket 32. In particular embodiments, the strengthening yarns 36 may be in contact with the outer surface 34 of the fiber jacket 32 and the inner surface 26 of the buffer tube 24. In embodiments, water-blocking yarns may be included with the strengthening yarns 36 or wound in a layer separate from the strengthening yarns 36. In the latter embodiments, the water-blocking yarns may, for example, be wound around the fiber jacket 32 such that they are in contact with the outer surface 34, or the water-blocking yarns may be wound around the strengthening yarns 36 such that they are in contact with the inner surface 26 of the buffer tube 24. The strengthening yarns 36 may be any of a variety of suitable strengthening yarns 36. For example, the strengthening yarns 36 may be made of aramid fibers, glass fibers, cotton fibers, liquid crystal polymer (LCP), carbon fiber, ultra-high molecular weight polyethylene (UHMWPE), an ethylene chlorotrifluoroethylene (ECTFE), a polybenzimidazole (PBI), a perfluoroalkoxy (PFA), a polytetrafluoroethylene (PTFE), a polyphenylene sulfide (PPS), or a polyphenylene benzobisoxazole (PBO).

In embodiments, the subunit 16 includes from two to twelve strengthening yarns 36 wrapped around the fiber jacket 34, more particularly six to ten strengthening yarns 36 (e.g., eight strengthening yarns 36). In embodiments, the strengthening yarns 36 are helically wrapped around the fiber jacket 34. In other embodiments, the strengthening yarns 36 are SZ-stranded around the fiber jacket 34. In still other embodiments, the strengthening yarns 36 are woven around the fiber jacket 34 or are straight (i.e., not wrapped, stranded, or woven) around the fiber jacket 34. Advantageously, the strengthening yarns 36 facilitate connectorization of the optical fiber 30. In particular, the strengthening yarns 36 help alleviate tensile stresses on the optical fiber 30 that result from plugging and unplugging of the connectorized optical fiber 30 from a receiving port.

The outer surface 20 and the inner surface 26 define an average thickness of the buffer tube 24. In embodiments, the buffer tube 24 has an average thickness of 0.1 mm to 5 mm. In other embodiments, the buffer tube 24 has an average thickness of 0.2 mm to 4 mm, and in still other embodiments, the buffer tube 24 has a thickness of 0.3 mm to 3 mm. In embodiments, the buffer tube 24 has an outside diameter defined by the outer surface 20 of from 0.5 mm to 11 mm, more particularly from 1 mm to 2 mm (e.g., about 1.65 mm).

Because the subunit 16 is designed for indoor use, the buffer tube 24 is made of a flame-retardant composition. In embodiments, the buffer tube 24 is comprised of at least one of ethylene-vinyl acetate copolymers, ethylene-acrylate copolymers, polyethylene homopolymers (low, medium, and high density), linear low-density polyethylene, very low density polyethylene, polypropylene homopolymer, polyolefin elastomer copolymer, polyethylene-polypropylene copolymer, butene- and octane-branched copolymers, or maleic anhydride-grafted versions of the polymers listed above. In another embodiment, exemplary polymers include halogenated thermoplastics (such as polyvinyl chloride); fluoropolymers; polyamide 6, 6/6, 11, or 12 resins; thermoplastic polyurethane; or a crosslinked polyethylene. The buffer tube 24 also includes one or more flame retardant additives, such as alumina trihydrate, magnesium hydroxide, pentaerythritol, ammonium polyphosphate, melamine, and ammonium octamolybdate, among others. In embodiments, the buffer tube 24 is a low-smoke, zero-halogen (LSZH) material (i.e., the buffer tube 24 includes smoke suppressing additives and does not contain any polymers or additives containing halogens). Further, in embodiments, the buffer tube 24 meets or exceeds relevant standards for flame retardance, such as being riser FT4 rated according to CSA C22.2 (and/or any other equivalent ratings and standards).

While the drop cable 10 has been described as having two strength elements 14, other embodiments of the drop cable 10 may have a single strength element 14 or more than two strength elements 14 (e.g., four strength elements 14).

Additionally, while the drop cable 10 has been described as having a single subunit 16, other embodiments of the drop cable 10 may have two or more subunits 16. Further, while the drop cable 10 has been depicted as having a single optical fiber 30 in a single subunit 16, other embodiments of the drop cable may have two or more optical fibers 30 total or per subunit 16. Further, the optical fibers may be single optical fibers as depicted in FIG. 1 or arranged in ribbons of two or more optical fibers 30. Indeed, embodiments will be discussed below in which there are more than two strength elements 14, more than a single subunit 16, and more than a single optical fiber cable 30.

As mentioned above, the drop cable 10 is designed for outdoor and indoor use. In particular, the cable jacket 12 is designed to protect the drop cable 10 and facilitate installation in the outdoors, and the subunit 16 is designed to comply with relevant standards, such as flame retardancy, for indoor use. In this regard, the drop cable 10 is fed through a duct (e.g., by jetting, blowing, pushing, and/or pulling) to a premise. For installation within the premises, the cable jacket 12 is removed, and the subunit 16 is routed within the premises to a desired installation point. In order to facilitate removal of the cable jacket 12 for routing of the subunit 16, access features 38 are provided within the cable jacket 12. As depicted in FIG. 1, the access features 38 are strips of a dissimilar polymer embedded within the polymer composition of the cable jacket 12. For example, in a polyethylene cable jacket 12, the access features 38 may be a strip of polypropylene running along the longitudinal axis of the drop cable 10. The strip of dissimilar polymer creates a line where bonding within the cable jacket 12 is weak so that the cable jacket 12 can be pulled apart, exposing the strength elements 14 and subunit 16. Once exposed, the strength elements 14 are trimmed, and the subunit 16 is routed within the premises. In embodiments, the access features 38 combine to equal a length that is from 25% to 80% of the diameter of the drop cable 10, more particularly 30% to 50% of the diameter of the drop cable 10. In embodiments, the access features 38 are arranged transverse or substantially perpendicularly to the plane defined by the strength elements 14.

Figure 2:
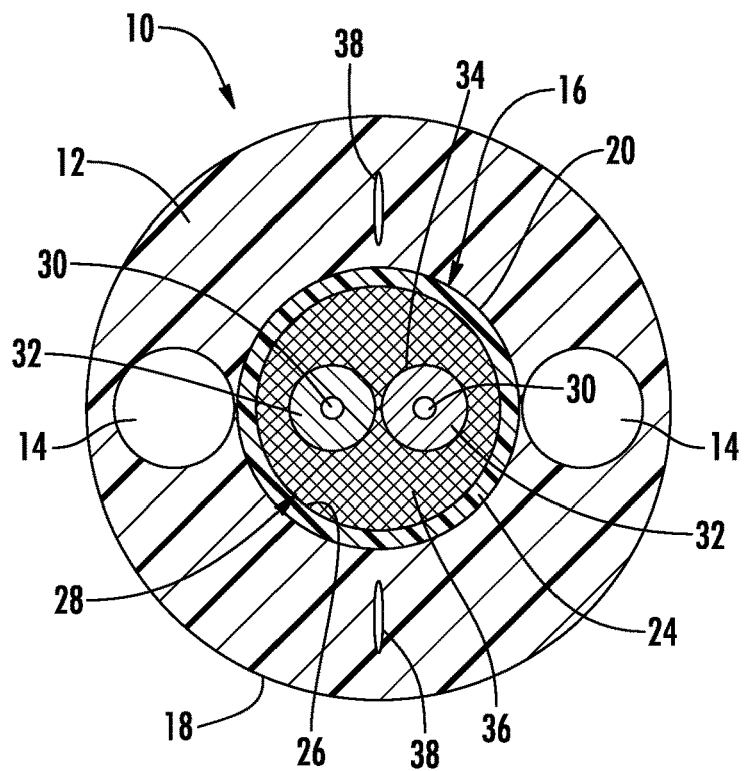
FIG. 2 depicts a longitudinal cross-sectional view of a drop cable for outdoor and indoor use and having a subunit with two optical fibers, according to an exemplary embodiment.

FIG. 2 depicts another embodiment of a drop cable 10. The drop cable 10 of FIG. 2 is substantially similar to the drop cable 10 of FIG. 1 with the exception that the drop cable of FIG. 2 includes two optical fibers 30. As with the previous embodiment, the embodiment of FIG. 2 includes a cable jacket 12 in which two strength elements 14 and one subunit 16 are embedded. The subunit 16 includes a buffer tube 24 defining a central bore 28. Disposed within the central bore 28 are two optical fibers 30, each surrounded by a tight-buffered fiber jacket 32. Strengthening yarns 36 are provided around the fiber jackets 32 such that the strengthening yarns 36 are disposed between the fiber jackets 32 and the inner surface 26 of the buffer tube 24. Additionally, strips of a dissimilar polymer are embedded in the cable jacket 12 to provide access features 38.

Figure 3:
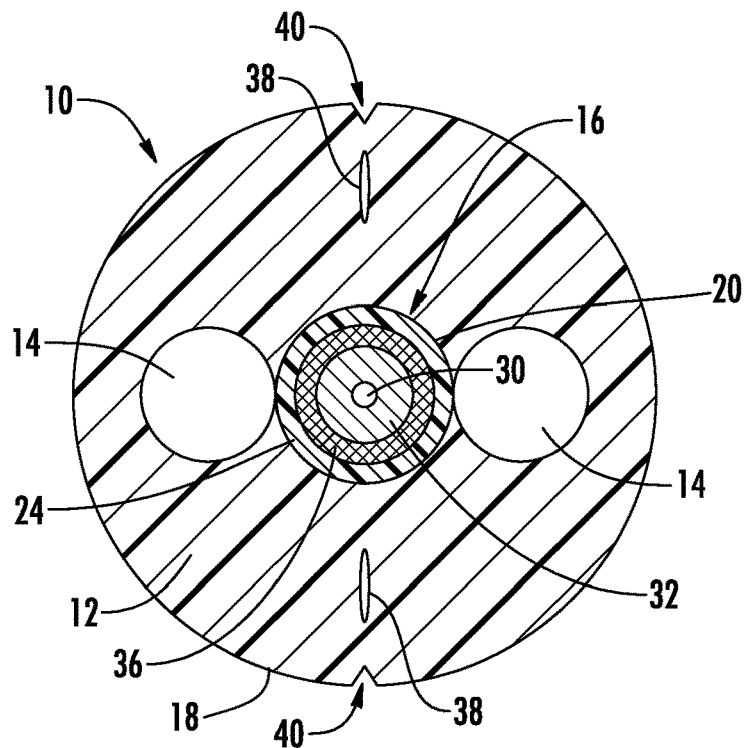
FIG. 3 depicts a longitudinal cross-sectional view of a drop cable for outdoor and indoor use and having locating notches for identifying the location of access features, according to an exemplary embodiment.

FIG. 3 depicts a further embodiment of a drop cable 10. The drop cable 10 of FIG. 3 is substantially similar to the drop cable of FIG. 1 with the exception that the drop cable 10 of FIG. 3 includes locating notches 40. As can be seen in FIG. 3, two strength elements 14 and a subunit 16 are embedded in the cable jacket 12. The subunit 16 includes a buffer tube 24 in which strengthening yarns 36 and an optical fiber 30 with a tight-buffered fiber jacket 32 are provided. Also embedded within the cable jacket 12 are access features 38. The locating notches 40 provide a visual and tactile indicator of the location of the access features 38 so that the cable jacket 12 can more readily be split during installation. For example, in embodiments, the notches 40 are arranged on the same plane as the access features 38 and that plane is transverse or substantially perpendicular to and bisects the plane running through the strength elements 14. In embodiments, the locating notches 40 have depth of from 0.2 mm to 0.5 mm, particularly about 0.3 mm. Additionally, in embodiments, the locating notches 40 have a width of from 0.2 to 0.7 mm, particularly about 0.5 mm. While FIG. 3 depicts two locating notches 40, the drop cable 10 could have a single locating notch 40 over one of the access features 38.

Figure 4:
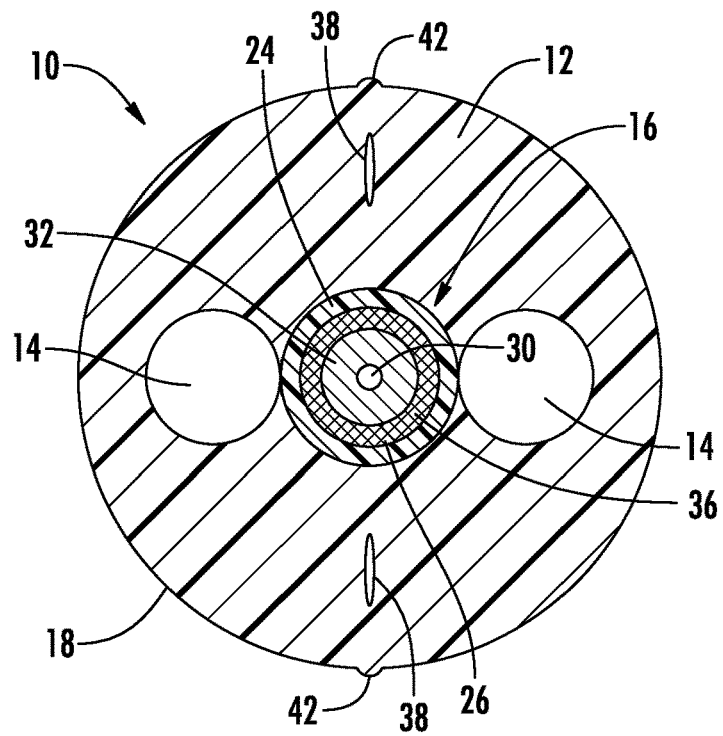
FIG. 4 depicts a longitudinal cross-sectional view of a drop cable for outdoor and indoor use and having locating ridges for identifying the location of access features, according to an exemplary embodiment.

FIG. 4 depicts still another embodiment of a drop cable 10. The drop cable of FIG. 4 is substantially similar to the drop cable 10 of FIG. 1 and the drop cable 10 of FIG. 3 with the exception that the drop cable of FIG. 4 includes locating ridges 42. As can be seen in FIG. 4, two strength elements 14 and a subunit 16 are embedded in the cable jacket 12. The subunit 16 includes a buffer tube 24 in which strengthening yarns 36 and an optical fiber 30 with a tight-buffered fiber jacket 32 are provided. Also embedded within the cable jacket 12 are access features 38. The locating ridges 42 provide a visual and tactile indicator of the location of the access features 38 so that the cable jacket 12 can more readily be split during installation. For example, in embodiments, the ridges 42 are arranged on the same plane as the access features 38 and that plane is transverse or substantially perpendicular to and bisects the plane running through the strength elements 14. In embodiments, the locating ridges 42 each have a height of from 0.2 mm to 0.6 mm, particularly about 0.4 mm. Further, in embodiments, two locating ridges 42 may be provided on each side of the cable jacket 12. In such embodiments, the locating ridges 42 may be spaced apart from each other by 0.3 mm to 0.7 mm, particularly about 0.5 mm, on either side of the plane running through the access features 38. While FIG. 4 depicts two locating ridges 42 and embodiments may have four locating ridges 42, the drop cable 10 could also have a single locating ridge 42 over one of the access features 38.

Figure 5:
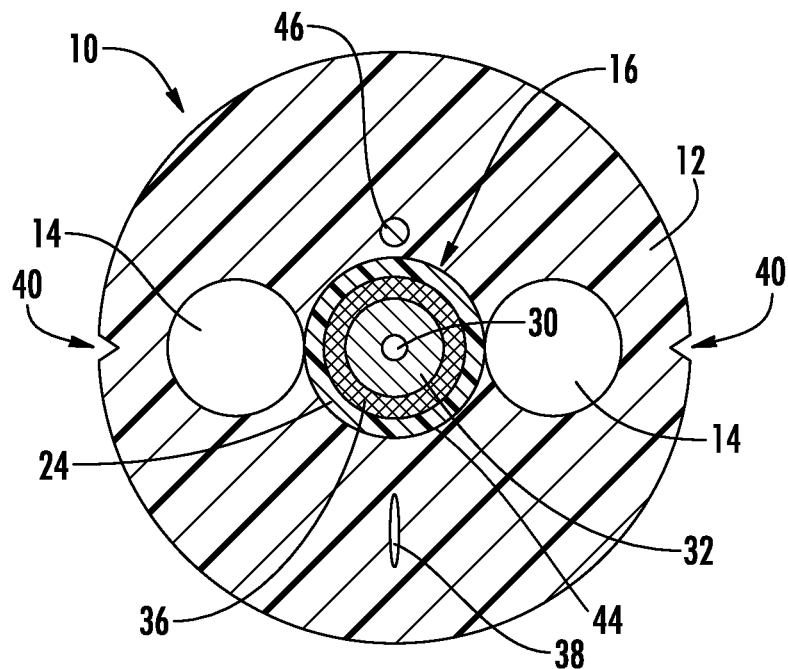
FIG. 5 depicts a longitudinal cross-sectional view of a drop cable for outdoor and indoor use and having a ripcord, thermal resistant tape, and locating notches for identifying the location of strength elements, according to an exemplary embodiment.

FIG. 5 depicts an additional embodiment of a drop cable 10. The drop cable 10 includes two strength elements 14 and a subunit 16 that are embedded in the cable jacket 12. The subunit 16 includes a buffer tube 24 in which strengthening yarns 36 and an optical fiber with a tight-buffered fiber jacket 32 are provided. Also embedded in the cable jacket 12 are a thermal resistant film 44 (shown as a layer on the outer surface 20 of the subunit 16) and a ripcord 46. The ripcord 46 facilitates access to the subunit 16, and the thermal resistant film 44 helps prevent the cable jacket 12 from sticking to the subunit 16. Further, in the embodiment of FIG. 5, locating notches 40 are formed into the cable jacket 12, but the locating notches 40 are placed on the same plane as the strength elements 14, providing a visual and tactile indication of the location of the strength elements 14. In another embodiment, locating ridges 42 could be used to identify the location of the strength elements 14 instead of locating notches 40.

Figure 6:
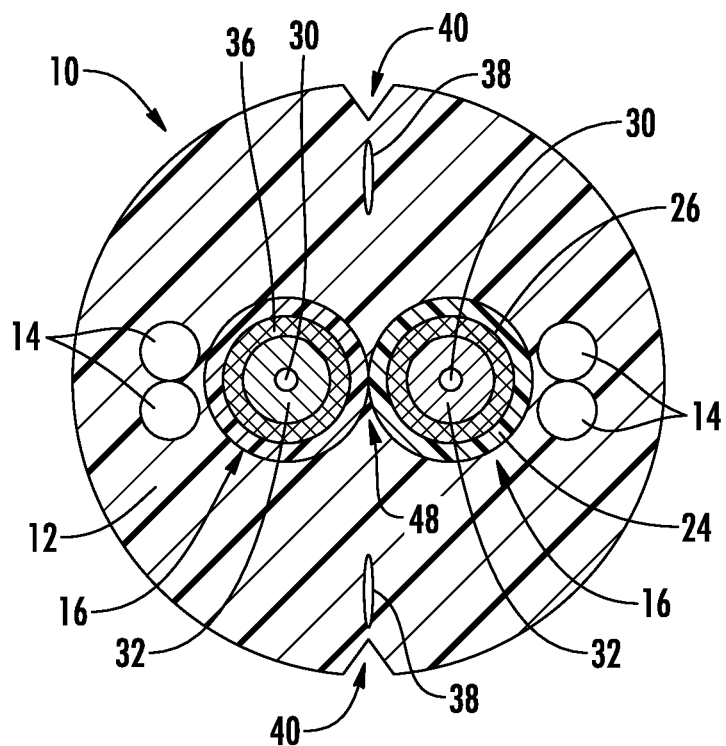
FIG. 6 depicts a longitudinal cross-sectional view of a drop cable for outdoor and indoor use and having four strength elements and two subunits, each with an optical fiber, according to an exemplary embodiment.

FIG. 6 depicts yet another embodiment of a drop cable 10. The drop cable 10 includes four strength elements 14 and two subunits 16 that are embedded in the cable jacket 12. Each subunit 16 includes a buffer tube 24 in which strengthening yarns 36 and an optical fiber 30 with a tight-buffered fiber jacket 32 are provided. In an embodiment, the subunits 16 are a "zip-cord"-type subunits in which the buffer tubes 24 are joined with a polymeric webbing 48 (e.g., thin polymer material bonding the outer surfaces 20 of the subunits 16 together). The webbing 48 keeps the subunits 16 together but also allows the subunits 16 to be easily split apart as necessary during installation. Also embedded within the cable jacket 12 are access features 38. The drop cable of the embodiment shown in FIG. 6 includes locating notches 40 to provide a visual and tactile indicator of the location of the access features 38 so that the cable jacket 12 can more readily be split during installation. For example, in embodiments, the locating notches 40 are arranged on the same plane as the access features 38, and that plane is transverse (i.e., substantially perpendicular) to and bisects the plane running through between the upper and lower strength elements 14. In embodiments, the webbing 48 is in the same plane as the locating notches 40 and the access features 38. Further, while locating notches 40 are depicted in FIG. 6, locating ridges 42 could be used instead in other embodiments. As shown in FIG. 6, the strength elements 14 are smaller than the strength elements shown in the previous figures. The smaller strength elements 14 are designed to provide substantially the same strength while also allowing for a smaller outer diameter of the drop cable 10. Additionally, using four smaller strength elements 14 as opposed to the two larger strength elements may be less expensive and may decrease the stiffness of the drop cable 10.

Figure 7:
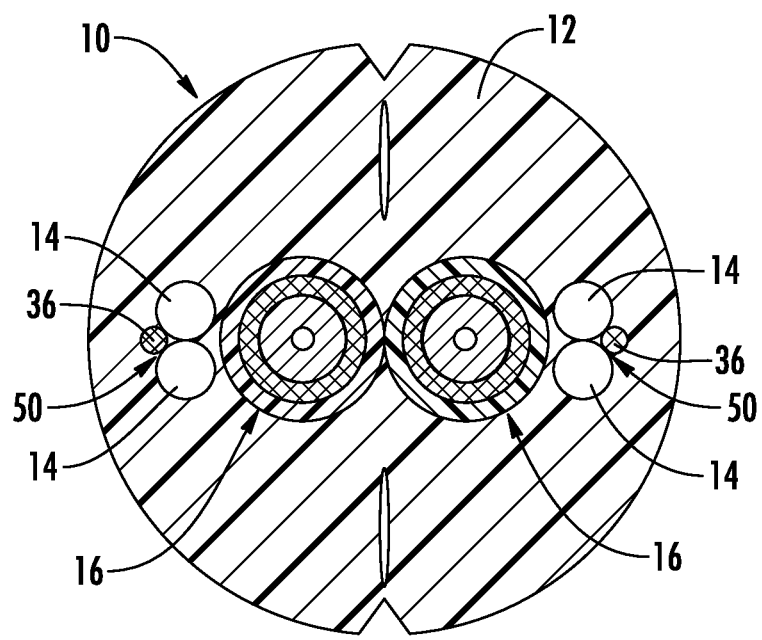
FIG. 7 depicts a longitudinal cross-sectional view of a drop cable for outdoor and indoor use and having four strength elements with strengthening yarns provided in interstitial spaces between the strength elements and two subunits, each with an optical fiber, according to an exemplary embodiment.

FIG. 7 depicts yet a further embodiment of a drop cable 10. The drop cable 10 of FIG. 7 is substantially similar to the drop cable 10 of FIG. 6 with the exception that the drop cable 10 of FIG. 7 includes strengthening yarns 36 disposed in interstitial spaces 50 between strength elements 14. In particular, in FIG. 7, two strength elements 14 are provided on one side of the zip-cord subunits 16, and two more strength elements 14 are provided on the opposite side of the zip-cord subunits 16. Between each set of two strength elements 14 are interstitial spaces 50. In the other interstitial space 50 of each set of strength elements 14, a strengthening yarn 36 is provided. The strengthening yarns 36 add strength without substantially decreasing the thickness of the cable jacket 12. The drop cable 10 of FIG. 7 may be used, e.g., in aerial self-support applications.

Figure 8:
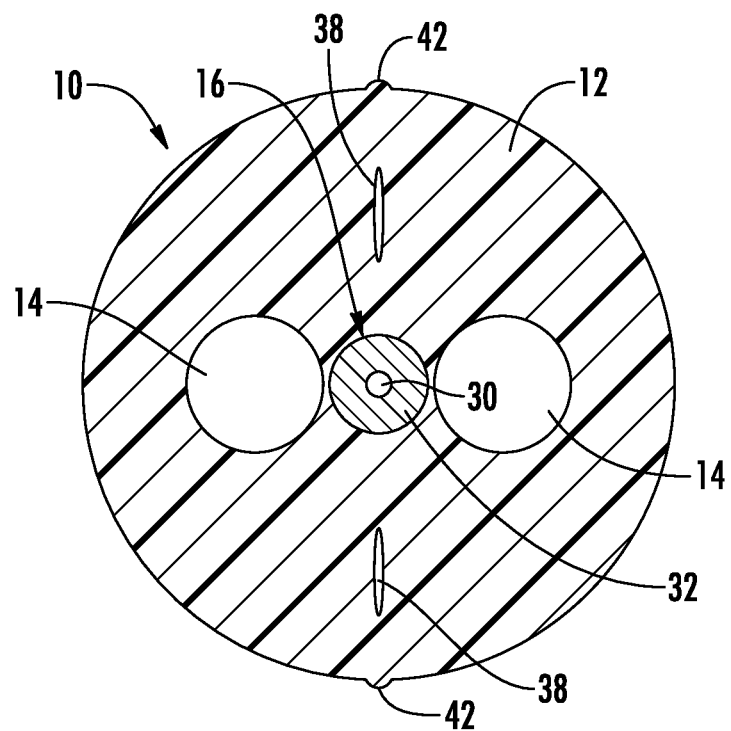
FIG. 8 depicts a longitudinal cross-sectional view of a drop cable for outdoor and indoor use and having a cable jacket directly in contact with a tight-buffered optical fiber, according to an exemplary embodiment.

FIG. 8 depicts still yet another embodiment of a drop cable 10 in which the subunit 16 is an optical fiber 30 with a tight-buffered fiber jacket 32. In the embodiment of FIG. 8, the cable jacket 12 is in direct contact with the fiber jacket 32. That is, there are no layers intervening between the cable jacket 12 and the fiber jacket 12. In the embodiment depicted in FIG. 8, also embedded in the cable jacket 12 are two strength elements 14 and access features 38. The access features 38 are transverse or substantially perpendicular to a plane defined by the strength elements 14. The drop cable 10 of FIG. 8 also includes locating ridges 42 that provide visual and tactile identification of the location of the access features 38. In another embodiment, the fiber jacket 32 may be omitted such that the cable jacket 12 is directly in contact with the optical fiber 30.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein the article "a" is intended to include one or more than one component or element and is not intended to be construed as meaning only one.

It will be apparent to those skilled in the art that various modifications and variations can be made without departing from the spirit or scope of the disclosed embodiments. Since modifications combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A method of providing optical communications to a premise, comprising the steps of:
feeding an optical fiber drop cable through a duct, the optical fiber drop cable comprising a cable jacket in which at least one subunit, a first strength member, and a second strength member are embedded, wherein the first and second strength members each have a diameter from 0.5 mm to 1.5 mm, wherein each of the at least one subunit comprises a flame retardant buffer tube in contact with the cable jacket, the flame retardant buffer tube defining a central bore including at least one optical fiber and a plurality of strengthening yarns disposed about the at least one optical fiber, wherein the optical fiber drop cable further comprises a first access feature and a second access feature, wherein a first plane defined by the first strength member and the second strength member is transverse to a second plane defined by the first access feature and the second access feature;
removing the cable jacket from the optical fiber drop cable by way of at least one of the first access feature or the second access feature to expose the at least one subunit;
routing the at least one subunit within the premise.

2. The method of claim 1, wherein the step of feeding the optical fiber drop cable through a duct comprises pushing the optical fiber drop cable through the duct using a compressed fluid.

3. The method of claim 1, wherein the cable jacket comprises a material having a coefficient of friction of from 0.15 to 0.25.

4. The method of claim 1, wherein the at least one subunit is riser FT4 rated according to CSA C22.2.

5. The method of claim 1, wherein the first strength member and the second strength member are glass-reinforced plastic (GRP) members.

6. The method of claim 1, wherein the first strength member and the second strength member are metal wires.

7. The method of claim 1, wherein the optical fiber drop cable has an outside diameter from 3 mm to 12 mm.

8. The method of claim 1, wherein an interstitial region is formed between an outer surface of the subunit and the first strength member, wherein a water-blocking element is disposed in the interstitial region.

9. The method of claim 1, wherein the at least one optical fiber is a tight-buffered optical fiber.

10. The method of claim 1, wherein the plurality of strengthening yarns are stranded or wrapped around the at least one optical fiber.

11. The method of claim 1, wherein the buffer tube has an average thickness of 0.1 mm to 5 mm.

12. The method of claim 1, wherein the first access feature and the second access feature are formed from respective strips of polymer that are dissimilar to a polymer used to form the cable jacket.

13. The method of claim 12, wherein the optical fiber drop cable further comprises a thermal resistant film disposed between an outer surface of the subunit and the cable jacket.

14. An optical fiber drop cable, comprising:
a cable jacket;
at least one subunit, wherein the at least one subunit comprises:
a flame-retardant buffer tube in contact with the cable jacket, the flame-retardant buffer tube defining a central bore;
at least one optical fiber disposed within the central bore; and
a plurality of strengthening yarns disposed about the at least one optical fiber;
a first strength member;
a second strength member;
a first access feature; and
a second access feature, wherein the at least one subunit, the first strength member, and the second strength member are embedded in the cable jacket, wherein the first and second strength members each have a diameter from 0.5 mm to 1.5 mm, wherein a first plane defined by the first strength member and the second strength member is transverse to a second plane defined by the first access feature and the second access feature.

* * * * *